United States Patent
Mutchler et al.

(10) Patent No.: US 6,491,963 B1
(45) Date of Patent: Dec. 10, 2002

(54) COMPRESSED BEAN COMPOSITE AND METHOD THEREFORE

(76) Inventors: Timothy I. Mutchler, 890 37th NE., Northwood, ND (US) 58267; Jerome Carter Wilson, 58 C Bell Rapids Rd., Hagerman, ID (US) 83332

( * ) Notice: Subject to any disclaimer, the term of this patent is extended or adjusted under 35 U.S.C. 154(b) by 0 days.

(21) Appl. No.: 09/561,029

(22) Filed: Apr. 28, 2000

(51) Int. Cl.⁷ .............................. A23L 1/20; A23L 1/18; A23L 1/10
(52) U.S. Cl. .................. 426/634; 426/285; 426/618; 426/512
(58) Field of Search ................. 426/634, 285, 426/618, 512

(56) References Cited

U.S. PATENT DOCUMENTS

| | | | |
|---|---|---|---|
| 4,182,779 A | 1/1980 | Chess | 426/558 |
| 4,282,258 A | 8/1981 | Forkner | 426/100 |
| 4,807,524 A | 2/1989 | Ikeuchi et al. | 99/353 |
| 4,936,200 A | 6/1990 | Buhler et al. | 99/353 |
| 5,223,297 A | 6/1993 | Theys et al. | 426/514 |
| 5,333,538 A | 8/1994 | Sawa | 99/353 |
| 5,609,896 A | 3/1997 | Cox et al. | 426/72 |
| 5,755,152 A | 5/1998 | Menzin | 99/363 |
| 5,871,793 A | 2/1999 | Capodieci | 426/238 |
| 6,001,403 A | 12/1999 | Kobayashi | 426/297 |
| 6,004,602 A | 12/1999 | D'Alterio | 426/285 |

FOREIGN PATENT DOCUMENTS

| | | | |
|---|---|---|---|
| JP | 58-877 | * | 1/1983 |
| JP | 2000-4813 | * | 1/2000 |
| JP | 2-167032 | * | 6/2000 |

* cited by examiner

Primary Examiner—Anthony J. Weier
(74) Attorney, Agent, or Firm—Curtis Harr

(57) ABSTRACT

A method of compressing cracked and split beans into useable cakes is provided. This process makes use of beans which have been broken into smaller pieces and are a natural result of the harvest and production methods and are considered undesirable and are separated out and either discarded or used in animal feed. The present invention takes these bean byproducts and combines them with rice, supplemental vitamins and minerals, and a binding agent and forms them into a uniformly shaped bean cake. These cakes can easily be packaged and stored for later shipping to an area where a highly nutritious and readily accessible food source is needed such as famine or disaster stricken locations.

14 Claims, 2 Drawing Sheets

FIG 2
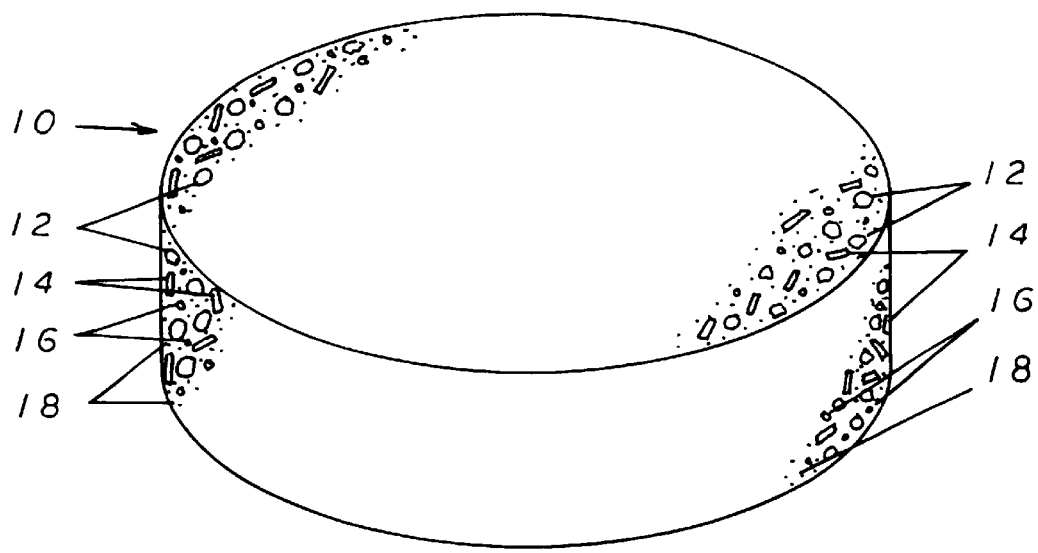
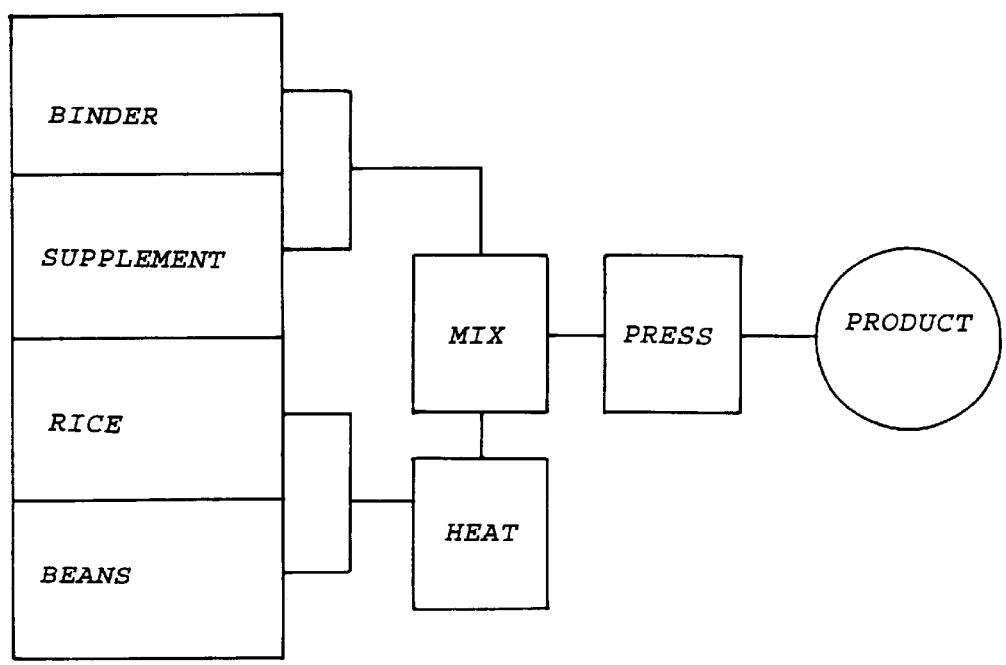
FIG 3

COMPRESSED BEAN COMPOSITE AND METHOD THEREFORE

BACKGROUND OF THE INVENTION

The present invention relates to an improvement in a compressed food product which may be easily broken down for consumption and more specifically, to a compressed bean based composite which is economical to store and transport and which may easily be re-hydrated for consumption.

The edible bean industry has been rapidly expanding in many areas. This expansion of the industry has created a surplus of bean byproducts such as splits and chips which are basically broken whole dried beans. These bean byproducts have an equal food value to whole beans but a very limited market and subsequently, a very low monetary value. Often times these bean byproducts are used as animal feed rather than for human consumption merely because visually, due to their broken nature, they are unsatisfactory for human consumption or sale. Further, even though these products have been deemed unsatisfactory, they have a certain cooking advantage over whole beans. It is well known that cracked and split beans cook at a faster speed as they have more surface area than a whole bean for the same amount of product, thus reducing cooking times.

It is well known that beans can provide a great deal of protein at a very low cost. It is also known that the quality and digestibility of beans can be improved by consuming them with cereal grains. Beans are a rich source of lysine, which is low in cereal grains. Cereal grains are high in methionine and other sulphur amino acids, which are low in beans. When beans and grains are served together in dishes like beans and rice, they provide a complimentary protein mixture.

The processing of rice and other grains often produces the same types of byproducts as discussed with beans. These chipped or split byproducts of grains, such as rice, are rarely sold for human consumption and normally may be sold for animal feed, again resulting in a very low monetary value.

Currently, even in disaster or poverty stricken regions, beans, rice and other grain products are shipped in bulk form while still allowing for the waste of the chipped or split products. Further, products in bulk form may present added shipping costs as well as packaging and distribution inconveniences.

From this discussion it can be seen that it would be desirable to produce a product that could be both nutritious and tasty, easy to transport and store and allow for the utilization of chipped or split products which are currently being wasted. In addition it can readily be seen that it would be desirable to condense and package for distribution and transport these products for all uses including use in disaster or poverty stricken regions.

SUMMARY OF THE INVENTION

It is the primary objective of the present invention to provide a method of making use of an existing surplus of bean byproduct to produce a compressed bean cake that is an otherwise overlooked food source.

It is an additional objective of the present invention to provide such a method of producing a compressed bean cake which makes use of the bean byproduct in conjunction with a relatively small percentage of rice or other similar grain and a wide variety of vitamins and minerals to produce a food source that is extremely high in nutrient value.

It is a further objective of the present invention to provide such a method of producing a compressed bean cake that will provide an inexpensive food source that can be easily used in relief efforts in poverty, disaster, and famine stricken areas and countries.

It is a still further objective of the present invention to provide such a method of producing compressed bean cakes which can be easily and inexpensively stored and shipped which also aids in their intended use in national and international relief efforts.

These objectives are accomplished by making use of cracked and split beans which are whole uncooked dry beans that have been broken into smaller pieces and are a natural result of the harvest and production methods used in the creation of the wide variety of bean products available in the market place today. The type of beans that are most commonly used in this are either black beans or pinto beans or some combination of the two, but the processes described here will work equally well with most any type of dry edible bean that are commonly available. These cracked and split beans are widely considered undesirable and are usually separated out and either discarded or used in animal feeds, neither of which provide a significant source of income to the producer.

The present invention is made up of these cracked and split beans and combines them with rice or other similar grains, along with a wide variety of supplemental vitamins and minerals and, by the use of a binding agent, is formed into a short cylindrically shaped cake. The binding agent is most commonly a potato flour or other similar starch that is mixed in with the other ingredients and which has the sole purpose of helping to hold the formed cakes together. Additionally, it is also possible to use a wide variety of other binding agents such as lards and other animal and vegetable fats but these have the disadvantage of either being more expensive or requiring the additional use of preservatives because of their shorter shelf lives, both of which unnecessarily add costs to the production of the present invention. Since one of the most attractive features of the present invention is its extremely low cost of production and delivery, any unnecessary additional cost works strongly against its intended purpose and functionality.

The bean cakes are formed by placing the ingredients into a series of individual compartments within a raw material bin that is located either adjacent to or as a part of the bean press. From the raw material bin, the cracked beans and rice are metered out in the proper proportions into the interior of the bean press where they are mixed together and then fed into a heat source. The heat source serves to bring the mixture to a predetermined temperature which is critical to the formation of the present invention. The reason for this is that a dry edible bean has the commonly known property of obtaining a certain degree of elasticity at a relatively high temperature which aids in the binding process with the other ingredients when the mixture is put under pressure.

Once the proper temperature of the beans has been obtained, the bean and rice mixture is then combined and mixed with the binder and supplement and is fed into the high pressure portion of the bean press. The press forms the mixture into short cylindrical objects that closely resemble hockey pucks by encasing a specified portion of the mixture within a mold and applying somewhere between five (5) tons per square inch and ten (10) tons per square inch to the mold. This amount of pressure compresses the ingredients and the elastic nature of the beans and the action of the binding agent work to hold them together in the form described above.

Once the ingredients have been formed into the bean cake within the bean press, they are placed on a conveyor belt which carries them out of the press for cooling to ambient temperature and transport to a holding container located at the end of the conveyor. From here the cakes can be packaged and stored for later shipping to an area where a highly nutritious and readily accessible food source is needed such as famine or disaster locations.

For a better understanding of the present invention reference should be made to the drawings and the description in which there are illustrated and described preferred embodiments of the present invention.

DESCRIPTION OF THE DRAWINGS

FIG. 2 is a perspective view of the present invention and illustrates the manner in which its constituents are bound together in the production process.

FIG. 3 is a schematic representation of the process that is used to produce the present invention and illustrates the various steps of its production.

DESCRIPTION OF THE PREFERRED EMBODIMENT

Figure 1:
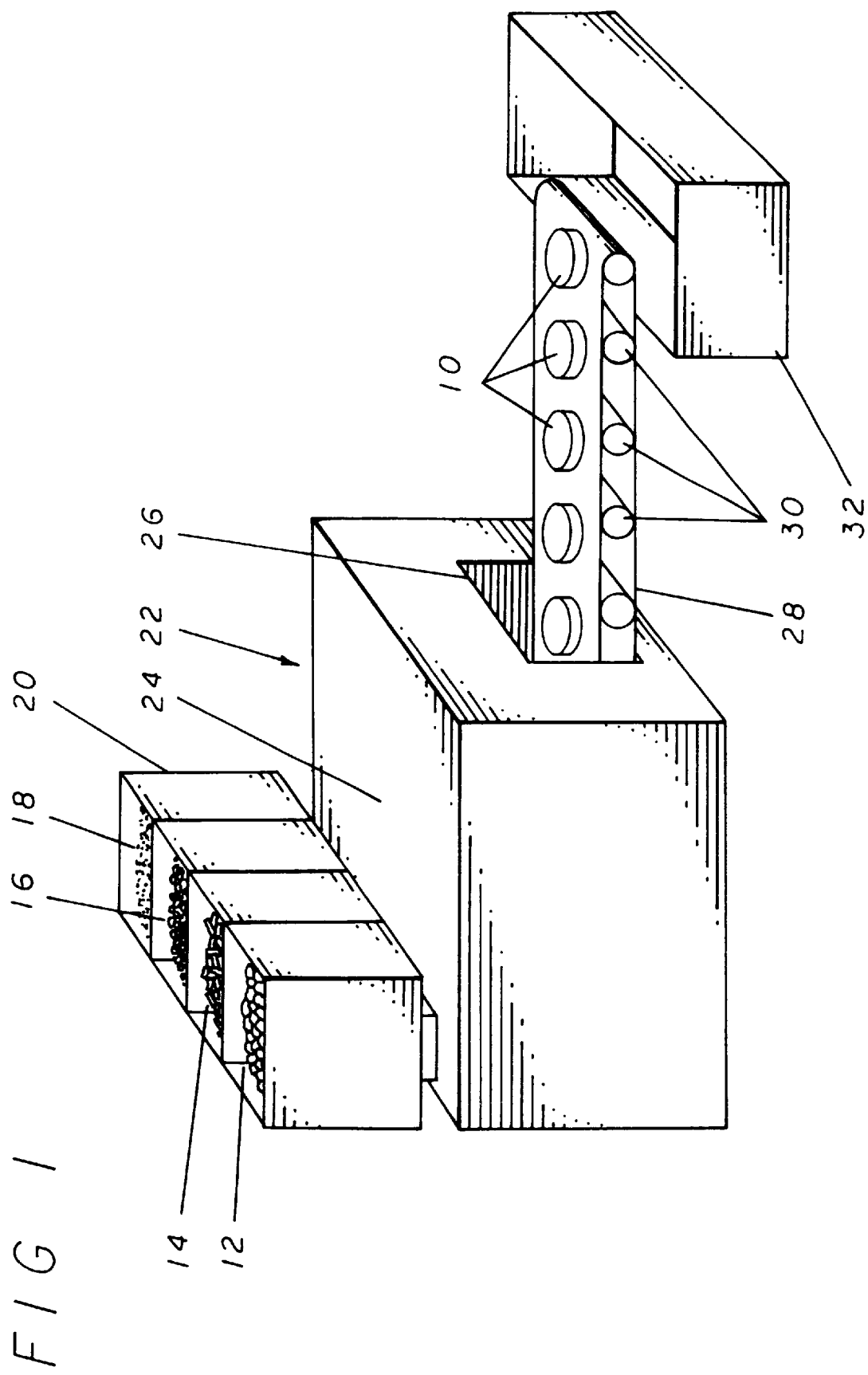
FIG. 1 is a perspective view of a specific method that could be employed to produce the present invention and includes a representation of the machinery that may be used in this production method.

Referring now to the drawings, and more specifically to FIGS. 1 and 2, the bean cake 10 is a relatively short cylindrical object that is primarily made of cracked and split beans 12 and rice 14. Both the beans 12 and the rice 14 start the process described herein as uncooked dry ingredients that have been unintentionally broken into smaller pieces as a natural result of the harvest and production methods used in their commercial processing. The types of beans 12 that are most commonly used in this process are either black beans or pinto beans or some combination of the two but the processes described here will work equally well with most any type of dry edible bean that is commonly available. The table below sets out as examples a few of the many possible different bean 12 and rice 14 combinations and also lists some other possible dry produce ingredients that can be added to the formation of the present invention to vary the finished product's flavor, consistency, and nutritional values.

| Preferred Combinations of Bean Composite | | | |
|---|---|---|---|
| Material Mix | Percentage of Material | | |
| Black Beans/Rice | 80% | 20% | |
| Pinto Beans/Rice | 80% | 20% | |
| Black Beans/Rice/Peas | 80% | 15% | 5% |
| Black Beans/Rice/Lentils | 80% | 15% | 5% |
| Pinto/Rice/Lentils/Carrot | 80% | 10% | 5% 5% |
| Pinto/Lentils/Carrot | 80% | 10% | 10% |

It must be noted that this chart is intended solely for illustrative purposes as to the flexibility of the present invention in regards to the primary ingredients that can be used with this process and is in no way intended to limit the scope of the invention to the items listed.

As previously stated, the present invention takes these cracked and split beans 12 and combines them with rice 14 and then further adds to this combination a variety of supplements 16 which consists primarily of vitamins and minerals. Once again, below is a list of potential vitamins and minerals that can be added to the present invention as part of the supplement 16 but this list is not necessarily intended to be either a complete list of all possible components of the supplement 16 or as a list of ingredients that are necessarily contained in each finished products produced by the methods described herein.

| LISTING OF COMMON NUTRITIONAL ADDITIVES | | |
|---|---|---|
| (May include potato and soy proteins) | | |
| Calcium | Iodine | Iron |
| Magnesium | Phosphorus | Potassium |
| Sodium | Copper | Manganese |
| Selenlum | Zinc | Thiamin |
| Vitamin C (Ascorbic Acid) | Riboflavin | Niacin |
| Pantothenic Acid | Vitamin B-6 | Folate |
| Vitamin B-12 | Vitamin A | Vitamin E |

In addition to the beans 12, rice 14 and supplement 16, the present invention also uses as one of its primary ingredients a binding agent 18 which is most commonly potato flour that has been mixed with a relatively small amount of water to form an aqueous solution or slurry. The binding agent's 18 purpose within the terms of the present invention is to help to hold the other ingredients together once they have been formed into the short cylindrical bean cake 10 and to act as a carrying agent within which the supplement 18 is suspended prior to the mixing with the beans 12 and rice 14.

Again, the binding agent 18 is most commonly made of a potato flour or other similar starch but it must also be noted that it is possible to use a wide variety of other binding agents such as lards and other animal and vegetable fats and soy products which do have the benefit of enhancing the invention's protein and amino acid profile. However, these materials are either significantly more expensive than the potato flour or have the disadvantage of requiring the additional use of preservatives because of their shorter shelf lives. In either case, significant costs are added to the production of the present invention and since one of its most attractive features is its low cost of production and delivery, any unnecessary additional costs work strongly against its intended purpose as a readily available and usable food source in famine or disaster stricken areas.

The bean cakes 10 themselves are formed by separately placing the cracked and split beans 12, the rice 14, the supplement 16, and the binder 18 into the individual compartments of the raw material bin 20 which is located either adjacent to or as a part of the bean press 22 which can be any one of the commonly available food presses that exist in the market place today. From the raw material storage bin 20, the cracked beans 12 and rice 14 are metered out in the proper predetermined proportions into the interior of the bean press 22 where they are mixed together and then fed into a heat source 24 contained within the body of the bean press 22 (the flow of the ingredients in the production process is further illustrated in FIG. 3). The heat source 24 serves to bring the mixture of beans 12 and rice 14 to a predetermined temperature, which is approximately 96 degrees Celsius, which is critical to the formation of the present invention. The reason for this is that a dry edible bean has the commonly known property of obtaining a certain degree of elasticity at temperature which aids in the binding process when the mixture is put under pressure as it allows the beans 12 particles to bind more effectively with other non-elastic particles. Additionally, it must also be noted that the application of heat to the rice 14 in the bean 12 and rice 14 mixture has no effect, either positive or negative, on the rice 14 as it passes through the heat source 24.

Once the proper temperature of the beans 12 has been obtained to produce the desired elasticity in the beans 12, the bean 12 and rice 14 mixture is then combined and mixed with the supplement 16 and binder 18 and the entire mixture is fed into the high pressure portion of the bean press 22. The bean press 22 forms the mixture into short cylindrical objects that closely resemble hockey pucks by encasing a specified portion of the mixture within a mold and applying somewhere between five (5) tons per square inch and ten (10) tons per square inch to the mold. This amount of pressure compresses the ingredients and the elastic nature of the heated beans 12 and the action of the binding agent 18 work to hold the mixture of ingredients together in a compact bean cake 10. It should further be stated at this point that although the preferred shape currently may be a cylindrical puck other shapes such as squares or are possible and this application should not be limited to the shapes presented herein.

Once the ingredients have been formed into the bean cake 10 within the bean press 22, they are cooled to ambient temperature and placed on a conveyor belt 28 that runs along a plurality of conveyor rollers 30 and which carries them out of the press 22 through the press opening 26 and to a product storage container 32 located at the end of the conveyor 28. From here the bean cakes 10 can be packaged and stored for later shipping to an area where a highly nutritious and readily accessible food source is needed such as famine or disaster locations.

Although the present invention has been described in considerable detail with reference to certain preferred versions thereof, other versions are possible for example it is not necessary to use splits or chips but rather whole product could be used. Therefore, the spirit and scope of the appended claims should not be limited to the description of the preferred versions contained herein.

What is claimed is:

1. An edible compressed bean composite comprising:
   beans making up from 49 to 90 percent by weight of said composite;
   grain making up from 9 to 49 percent by weight of said composite;
   a binder in an aqueous solution for holding said beans and grain together;
   said composite being mixed so as to be substantially homogeneous throughout; and
   said composite being formed under pressure so as to remove substantially all voids and excess liquids such that said composite is suitable for later cooking and re-hydration.

2. An edible compressed bean composite as in claim 1 wherein said beans are substantially cracked, split or non-conforming beans.

3. An edible comprised bean composite as in claim 2 wherein said grains are rice.

4. An edible compressed bean composite as in claim 3 further comprising nutritional supplement mixed with said beans, rice and binder.

5. An edible compressed bean composite as in claim 4 wherein said beans have been heated to a temperature of at least 80 degrees Celsius for a period of at least 10 minutes prior to mixing said beans with said rice, binder and additives.

6. An edible compressed bean composite as in claim 5 wherein said beans, rice, binder and additives have been formed under a pressure of at least 8000 psi into a uniform shape.

7. An edible compressed bean composite as in claim 6 wherein said uniform shape is disc shaped puck.

8. An edible compressed bean composite comprising:
   beans making up from 60 to 90 percent by weight of said composite;
   edible filler other than beans making up from 5 to 35 percent by weight of said composite;
   a binder in an aqueous solution for holding said beans and rice together;
   said composite being mixed so as to be substantially homogeneous throughout;
   said composite being formed under a pressure of at least 8000 psi so as to remove substantially all voids and excess liquids such that said composite is suitable for later cooking and re-hydration.

9. An edible compressed bean composite as in claim 8 wherein beans, said filler and said binder have been mixed and formed into a uniform shape for distribution.

10. An edible compressed bean composite as in claim 9 wherein said beans have been heated to a temperature of at least 80 degrees Celsius for a period of at least 10 minutes prior to being formed for distribution.

11. An edible compressed bean composite as in claim 10 wherein said edible filler is selected from the group consisting of dried rices, dried peas, dried lentilss and dried carrots.

12. An edible compressed bean composite as in claim 11 wherein said beans are substantially cracked, split or non-conforming.

13. An edible compressed bean composite as in claim 12 further comprising at least one nutritional supplement mixed with said beans, said filler and said binder.

14. An edible compressed bean composite as in claim 13 wherein said uniform shape is disc shaped puck.

* * * * *